United States Patent
Tian et al.

(10) Patent No.: US 11,679,552 B2
(45) Date of Patent: Jun. 20, 2023

(54) DIRECT INKWRITING DEVICE AND METHOD FOR A BIAS-CONTROLLABLE CONTINUOUS FIBER REINFORCED COMPOSITE MATERIAL

(71) Applicant: Xi'an Jiaotong University, Shaanxi (CN)

(72) Inventors: Xiaoyong Tian, Shaanxi (CN); Qingrui Wang, Shaanxi (CN); Daokang Zhang, Shaanxi (CN); Dichen Li, Shaanxi (CN)

(73) Assignee: Xi'an Jiaotong University

( * ) Notice: Subject to any disclaimer, the term of this patent is extended or adjusted under 35 U.S.C. 154(b) by 75 days.

(21) Appl. No.: 17/182,597

(22) Filed: Feb. 23, 2021

(65) Prior Publication Data

US 2021/0387408 A1 Dec. 16, 2021

(30) Foreign Application Priority Data

Jun. 13, 2020 (CN) .......................... 202010539017.X

(51) Int. Cl.
| | |
|---|---|
| *B29C 64/165* | (2017.01) |
| *B33Y 10/00* | (2015.01) |
| *B33Y 30/00* | (2015.01) |
| *B33Y 40/00* | (2020.01) |
| *B29C 64/321* | (2017.01) |

(Continued)

(52) U.S. Cl.
CPC .......... *B29C 64/165* (2017.08); *B29C 64/209* (2017.08); *B29C 64/259* (2017.08); *B29C 64/321* (2017.08); *B33Y 10/00* (2014.12); *B33Y 30/00* (2014.12); *B33Y 40/00* (2014.12)

(58) Field of Classification Search
CPC ... B29C 64/118; B29C 64/209; B29C 64/165; B29C 70/0035; B29C 70/16; B29C 70/382; B29C 70/50; B29C 64/321
See application file for complete search history.

(56) References Cited

U.S. PATENT DOCUMENTS 5,121,329 A * 6/1992 Crump ................... B33Y 30/00
228/180.5
5,134,569 A * 7/1992 Masters ................ B29C 64/106
425/162

(Continued)

*Primary Examiner* — James Sanders
(74) *Attorney, Agent, or Firm* — Genius Patent APC; Bruce Angus Hare

(57) ABSTRACT

A direct ink writing device and method for a bias-controllable continuous fiber reinforced composite material are provided. The device includes a cartridge fixed by an external device, a bottom of the cartridge is connected to a nozzle. A piston is arranged in the cartridge, the piston is provided with a chamber for containing sealing liquid and a capillary for a continuous fiber to pass through. The centers of an inner circumference and an outer circumference of the cartridge do not coincide with each other. The bias position of the continuous fiber in the composite material is achieved using the piston, and each filament of composite material is printed in steps of rotation, extrusion, revolution and curing. A structure produced according to the disclosure has high mechanical properties and outstanding intelligent properties, and the bias position of the continuous fiber material in the structure can be accurately adjusted.

1 Claim, 1 Drawing Sheet

(51) Int. Cl.
*B29C 64/259* (2017.01)
*B29C 64/209* (2017.01)

(56) References Cited

U.S. PATENT DOCUMENTS

| | | | | |
|---|---|---|---|---|
| 5,936,861 | A * | 8/1999 | Jang | B33Y 30/00 |
| | | | | 700/98 |
| 6,129,872 | A * | 10/2000 | Jang | B33Y 10/00 |
| | | | | 425/162 |
| 10,105,910 | B2 * | 10/2018 | Tyler | B29C 35/0261 |
| 10,232,550 | B2 * | 3/2019 | Evans | B29C 64/118 |
| 2012/0090788 | A1 * | 4/2012 | Oldani | B29C 70/384 |
| | | | | 156/441 |
| 2012/0279441 | A1 * | 11/2012 | Creehan | B23K 20/128 |
| | | | | 228/2.1 |
| 2014/0061974 | A1 * | 3/2014 | Tyler | B33Y 50/02 |
| | | | | 264/401 |
| 2016/0067928 | A1 * | 3/2016 | Mark | B29C 70/16 |
| | | | | 425/150 |
| 2016/0136887 | A1 * | 5/2016 | Guillemette | B29C 69/001 |
| | | | | 425/297 |
| 2016/0288395 | A1 * | 10/2016 | Shen | B29C 64/209 |
| 2016/0303802 | A1 * | 10/2016 | Meshorer | B29C 48/92 |
| 2017/0120513 | A1 * | 5/2017 | Brennan | B29B 7/401 |
| 2017/0136690 | A1 * | 5/2017 | Kanematsu | B29C 67/00 |
| 2017/0151728 | A1 * | 6/2017 | Kune | B29C 64/209 |
| 2017/0210074 | A1 * | 7/2017 | Ueda | B29C 64/393 |
| 2018/0141274 | A1 * | 5/2018 | Fink | H01B 7/0233 |
| 2019/0202120 | A1 * | 7/2019 | Budge | B33Y 50/02 |
| 2019/0366639 | A1 * | 12/2019 | Barocio | B29C 64/118 |
| 2020/0047402 | A1 * | 2/2020 | De Backer | B29C 64/209 |
| 2020/0086574 | A1 * | 3/2020 | Budge | B29C 64/321 |
| 2020/0114578 | A1 * | 4/2020 | Azarov | B29C 64/118 |
| 2020/0130276 | A1 * | 4/2020 | Ueda | B29C 64/241 |
| 2020/0298484 | A1 * | 9/2020 | Ageishi | B29C 64/241 |

* cited by examiner

DIRECT INKWRITING DEVICE AND METHOD FOR A BIAS-CONTROLLABLE CONTINUOUS FIBER REINFORCED COMPOSITE MATERIAL

CROSS-REFERENCE TO RELATED APPLICATIONS

This application claims the priority of Chinese Patent Application serial number 202010539017.X entitled "DIRECT INK WRITING DEVICE AND METHOD FOR A BIAS-CONTROLLABLE CONTINUOUS FIBER REINFORCED COMPOSITE MATERIAL", filed with the Chinese Patent Office on Jun. 13, 2020, which is incorporated herein by reference in its entirety.

TECHNICAL FIELD

The disclosure relates to the field of 3D printing technology, and in particular to a direct ink writing device and method for a bias-controllable continuous fiber reinforced composite material.

BACKGROUND

In recent years, with the development of 3D printing technology, mechanical properties and other functional properties of a corresponding product have been significantly improved. On this basis, it is expected that the printing structure not only has certain mechanical strength and rigidity, but also has specific intelligent characteristics. Such structure has great potential application value in the fields of aerospace (such as a truss structure with controllable deformation), intelligent robots, mechanical metamaterials, and the like. To achieve this goal, in addition to optimization of intelligent matrix materials and reinforcement materials, new processes also need to be developed based on existing 3D printing technology.

Continuous fiber reinforced composite material has extremely high mechanical properties, especially in specific strength and specific stiffness. At present, 3D printing methods for continuous fiber reinforced composite materials mainly adopt the fused deposition modeling process, wherein matrix materials adopted in the printing process are generally non-intelligent polymer material, and most intelligent materials, such as liquid crystal elastomers, piezoelectric materials, and shape memory polymers, cannot be prepared by the fused deposition modeling process. In addition, although the addition of a small number of functional components to a matrix can improve partial properties of the composite material, it is difficult to optimize the parameters of the formula of the composite material using the fused deposition modeling process, because the extrusion process for printing wires consumes too much raw material and the cost of intelligent material is too high.

The direct ink writing process is commonly used for 3D printing of intelligent material due to the following characteristics: (1) only a small amount of material needs to be prepared for a single printing, so that the cost of the parameter optimization of the formula is greatly saved; and (2) the prepared material generally only needs to meet certain shear thinning characteristics and rapid curing capability, so that the formula can be designed with a high degree of freedom. However, the mechanical properties of the matrix material used in the direct ink writing process after being cured are not good enough, so some mechanical reinforcing materials need to be added. At present, only mechanical reinforcing materials such as short fibers, particles and the like can be added in the direct ink writing process, but continuous fibers which improve the mechanical properties of the direct ink writing process by one or more orders of magnitude cannot be added, mainly due to the following difficulties: (1) in order to extrude material accurately, a cartridge used for containing ink must be sealed, and the sealed chamber does not allow the continuous fiber to pass into and out of the chamber; and (2) the bias position of the fiber in the matrix greatly influences the mechanical properties and functional properties of the structure, however, the 3D printing process for continuous fiber reinforced composite material including fused deposition modeling process cannot control the bias position of fiber in the matrix.

SUMMARY

In order to overcome the defects of the prior art, an object of some embodiments is to provide a direct ink writing device and method for a bias-controllable continuous fiber reinforced composite material, by which a produced structure has both high mechanical properties and outstanding intelligent properties, and the bias position of the continuous fiber material in the structure produced by printing can be accurately controlled.

In order to achieve the above object, the disclosure adopts the following technical scheme:

A direct ink writing 3D printing device for a bias-controllable continuous fiber reinforced composite material, including a cartridge 20, wherein the cartridge 20 is fixed to an external device through a cartridge holder 12. A bottom of the cartridge 20 is connected to a nozzle 13, and a perforated printing base plate 16 is arranged below the nozzle 13; the cartridge 20 is provided with a through hole on one side thereof so as to be connected to a hose 5 and in turn connected to a solution storage 7 and an air pump 6; a piston 18 is arranged in the cartridge 20, the piston 18 is provided with an upper chamber for containing sealing liquid 17 and a capillary for a continuous fiber 10 to pass through, a bore is formed in a top of the piston 18 for leading out the continuous fiber 10, and the continuous fiber 10 led out through the bore is connected to a tensioning wheel 11; the piston 18 is fixedly connected to a connecting shaft 9, the connecting shaft 9 is connected to an external vertical moving device through a rotary bearing 8, and is connected to a motor belt wheel 1 of a motor 3 through a belt wheel and a synchronous belt 2, and the motor 3 is fixed to the external vertical moving device through a motor seat 4.

The centers of an inner circumference and an outer circumference of the cartridge 20 do not coincide with each other, the center of the outer circumference of the cartridge 20 coincides with an axis of the connecting shaft 9, the center of the inner circumference of the cartridge 20 coincides with an axis of the piston 18, and the upper chamber of the piston 18 contains the sealing liquid 17, and a lower chamber of the cartridge 20 contains a printing matrix solution 19.

Before printing a structure made of the composite material, the continuous fiber 10 sequentially passes through the tensioning wheel 11, the piston 18, the cartridge 20, the nozzle 13 and the perforated printing base plate 16 and is fixed. Both the cartridge 20 and the solution storage 7 contain the printing matrix solution 19, and the piston 18 contains the sealing liquid 17 in the upper chamber. When printing begins, each filament of the composite material 14 is printed in four steps of rotation, extrusion, revolution, curing. In the step of the rotation, a rotation angle of the motor 3 is controlled so as to control a bias position of the continuous fiber 10 in the composite material 14. In the step of the extrusion, the continuous fiber 10 and the printing matrix solution 19 are extruded simultaneously and vertically downwards, and an external stimulus is applied only to parts of the extruded composite material 14 other than a top end and a bottom end of the extruded composite material 14 to make the parts cured. In the step of revolution, movement of the cartridge 20 is adjusted such that the composite material 14 revolves around a center which is the bottom end of the composite material 14, until the composite material moves to a proper position; and in the step of curing, the composite material 14 is fully cured; after the above steps are performed, a next filament of the composite material 14 is to be printed, and the above steps are to be repeated until the structure is obtained.

A printing method based on the direct ink writing device for a bias-controllable continuous fiber reinforced composite material, including following steps.

At step S1, a geometric size of the structure is designed according to property requirements of an object to be formed, and a printing path is calculated by using MATLAB, and a program about a relative movement of the cartridge 20 and the printing base plate 16 is written.

At step S2, a material of the continuous fiber 10 and a kind of the printing matrix solution 19 are selected, and the continuous fiber 10 is selected from a group consisting of carbon fiber, aramid fiber, and glass fiber, the printing matrix solution 19 is a monomer of a functional material with required characteristics.

At step S3, two alternative modes for extruding the material are adopted, one mode is to extrude the printing matrix solution 19 through vertical downward movement of the piston 18 while the hose 5 is throttled and sealed, and another mode is to drive the printing matrix solution 19 in the solution storage 7 by means of hydraulic pressure via the air pump 6 to flow through the hose 5 into the cartridge 20 so as to be extruded.

At step S4, the upper chamber above the capillary of the piston 18 is filled with the sealing liquid 17 and the lower chamber below the capillary of the cartridge 20 is filled with the printing matrix solution 19, so that air is blocked by the sealing liquid 17 from entering the lower chamber through the capillary.

At step S5, the continuous fiber 10 is biased to one side of the composite material 14 under an action of a tension due to an eccentric arrangement of the lower chamber of the cartridge 20. The tension wheel 11 provides a stable tension for the continuous fiber 10, and the motor 3 can control the rotation angle of the connecting shaft 9, thereby regulating the bias position of the continuous fiber 10 in the extruded composite material 14.

At step S6, an external stimulus (an irradiation by using the digital graphic ultraviolet light) is applied to the extruded composite material 14 so that the external stimulus is not directly applied to the top end or the bottom end of the composite material 14 during the extrusion of the composite material 14, to make the composite material 14 cured rapidly. After the parts of the composite material 14 other than the bottom end and the top end of the composite material 14 is fully cured under the external stimulus, the print head is moved to rotate the composite material 14 to a desired angle, then sufficient external stimulus is applied to make the composite material 14 fully cured, thereby producing the structure 15 on the printing base plate 16 meeting the property requirements.

The printing matrix solution 19 is selected from a group consisting of liquid crystal elastomer monomers, shape memory polymer monomers and chromic material monomers, and comprises following components: solvents, curing agents, initiators, oxygen inhibitors, and free radical quenchers.

The beneficial effects of the disclosure are as follows.

According to the disclosure, the direct ink writing process for continuous fibers reinforced composites is innovatively used to produce a composite material having both the intelligent characteristic and mechanical strength, so that the problem that the continuous fiber reinforced composite material cannot be printed by the direct ink writing process is solved. Further, the printing method can control the bias position of the fiber in the composite material, and can be used for producing structures with special functions such as a controllable deformation structure, etc. In addition, the printing device has two alternative liquid extrusion modes, i.e., hydraulic pushing model and piston pushing model, and the produced structure has a certain application prospect in the fields of aerospace, robots, metamaterials, etc.

DETAILED DESCRIPTION

The present disclosure will now be described in further detail with reference to the accompanying drawings.

Figure 1:
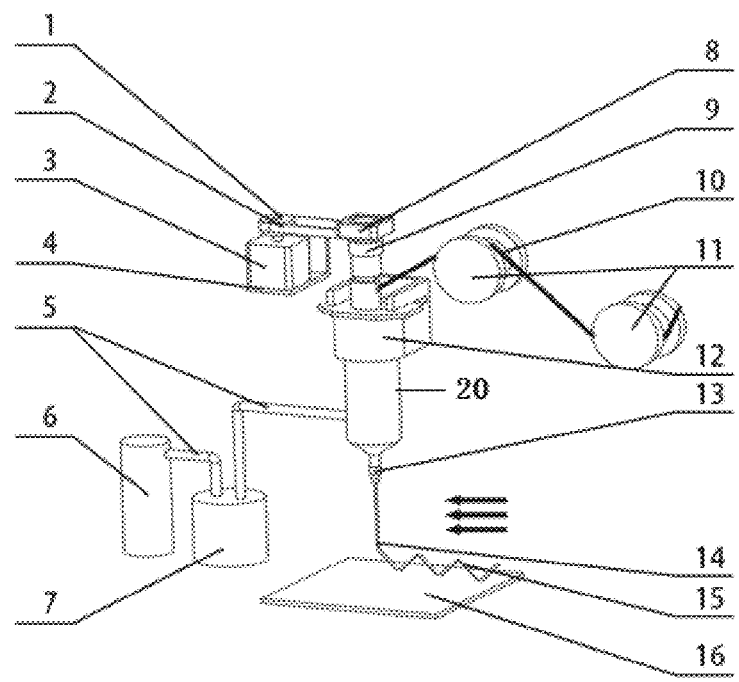
FIG. 1 is a schematic diagram of a device according to the present disclosure.
Figure 2:
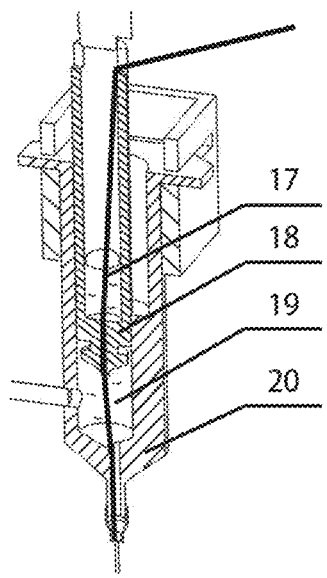
FIG. 2 is a cross-sectional view of a piston 18 and a cartridge 20 according to the present disclosure.

Referring to FIGS. 1 and 2, a direct ink writing device for a bias-controllable continuous fiber reinforced composite material, includes a cartridge 20 used for containing a printing matrix solution 19 and fully mixing the printing matrix solution 19 with a continuous fiber 10. The cartridge 20 is fixed to an external device through a cartridge holder 12, a bottom of the cartridge 20 is connected to a nozzle 13, and a perforated printing base plate 16 is arranged below the nozzle 13. The cartridge 20 is provided with a through hole on one side thereof so as to be connected to a hose 5 and then connected to a solution storage 7 and an air pump 6. A piston 18 is arranged in the cartridge 20, the piston 18 is provided with a chamber for containing sealing liquid 17 and a capillary for a continuous fiber 10 to pass through. A bore is formed in the top of the piston 18 for leading out the continuous fiber 10, and the continuous fiber 10 led out through the bore is connected to a tensioning wheel 11. The piston 18 is fixedly connected to a connecting shaft 9 by screw connection, et cetera. The connecting shaft 9 is connected to an external vertical moving device through a rotary bearing 8, and is connected to a motor belt wheel 1 of a motor 3 through a belt wheel and a synchronous belt 2, and the motor 3 is fixed to the external moving device through a motor seat 4.

The centers of the inner circumference and outer circumference of the cartridge 20 do not coincide with each other, the center of the outer circumference of the cartridge 20 coincides with an axis of the connecting shaft 9, the center of the inner circumference of the cartridge 20 coincides with an axis of the piston 18, and an upper chamber above the capillary of the piston 18 contains the sealing liquid 17, and a lower chamber below the capillary of the cartridge 20 contains printing matrix solution 19.

Before printing a structure made of the composite material, the continuous fiber 10 sequentially passes through the tensioning wheel 11, the piston 18, the cartridge 20, the nozzle 13 and holes in the perforated printing base plate 16 and is fixed. The cartridge 20 and the solution storage 7 contain the printing matrix solution 19, and the piston 18 contains the sealing liquid 17 in the upper chamber. When the printing begins, each filament of the composite material 14 is printed in four steps, i.e., rotation, extrusion. revolution, and full curing. In the rotation step, a rotation angle of the motor 3 is controlled so as to control a bias position of the continuous fiber 10 in the composite material 14. In the extrusion step, the continuous fiber 10 and the printing matrix solution 19 are extruded simultaneously and vertically downwards, and an external stimulus (e.g., digital graphic ultraviolet light) is applied only to parts of the extruded composite material 14 other than a top end and a bottom end of the extruded composite material 14 to make the parts cured. In the revolution step, the cartridge 20 is controlled to move along an arc trajectory with the bottom of the composite material 14 as a center of the arc, and the composite material 14 revolves along with the movement of the cartridge 20 until the composite material 14 rotates to a proper angle. After the above three steps, the composite material 14 is fully cured, a next filament of composite material 14 is then printed, and the steps are repeated until printing is completed.

Referring to FIGS. 1 and 2, a printing method based on the direct ink writing device for a bias-controllable continuous fiber reinforced composite material described above, includes following steps.

In step S1, a geometric size of a three-dimensional structure is designed according to property requirements of an object to be formed, and a printing path is calculated by using MATLAB, and a program about relative movement of the cartridge 20 and the printing base plate 16 is written.

In step S2, a material of the continuous fiber 10 and a kind of the printing matrix solution 19 are selected to meet the property requirements. The continuous fiber 10 is selected from a group consisting of carbon fiber, aramid fiber, glass fiber and other continuous fiber that may be bonded to the matrix, and the printing matrix solution 19 is a monomer of a functional material with certain characteristics, such as a liquid crystal elastomer monomer, a shape memory polymer monomer, or a chromic material monomer, etc., and further including the following components: a solvent, a curing agent, an initiator, an oxygen inhibitor, etc. In addition, as a large amount of initiator is used to rapidly cure the printed structure so as to prevent any influence on the bias position of the fiber, and a high content of photoinitiator may cause diffusion of high-concentration free radicals, free radical quenchers are desired to be included in a formula of the printing matrix solution 19.

In step S3, two alternative modes for extruding the material are adopted, wherein one mode is to extrude the printing matrix solution 19 through vertical downward movement of the piston 18 while the hose 5 needs to be throttled and sealed. This mode is advantageous in saving cost of printing material. Another mode is to drive the printing matrix solution 19 in the solution storage 7 by using a hydraulic pressure via the air pump 6 to flow through the hose 5 into the cartridge 20 so as to be extruded, and this mode is advantageous in controlling the amount of extruded material more accurately.

In step S4, in order to feed the continuous fiber 10 without loss of tightness in the chamber of the cartridge 20, the capillary with an extremely small diameter is provided in the piston 18 for the continuous fiber 10 to pass through. The upper chamber above the capillary of the piston 18 is filled with the sealing liquid 17, and the lower chamber of the capillary of the cartridge 20 is filled with the printing matrix solution 19, and the two liquids may include the same components to prevent introduction of impurities during printing. This design can hinder the printing matrix solution 19 from flowing upwards from the capillary to the outside of the chamber under the pressure action of the piston 18, and air cannot enter the lower chamber through the capillary as blocked by the sealing liquid 17 when the printing is stopped.

In step S5, in order to achieve the bias position of the continuous fiber 10 in the extruded composite material 14, the continuous fiber 10 is biased to one side of the composite material 14 under an action of a tension due to an eccentric arrangement of the lower chamber of the cartridge 20. The tension wheel 11 provides a stable tension for the continuous fiber 10 so as to enable the bias position of the continuous fiber 10 to be stable. The upper part of the piston 18 is fixedly connected to a connecting shaft 9, and the connecting shaft 9 is connected to the external vertical moving device through the rotary bearing 8, and is connected to a motor belt wheel 1 of a motor 3 through a belt wheel and a synchronous belt 2. The motor is fixed to the external moving device through the motor seat 4, and the motor can control the rotation angle of the connecting shaft 9, thereby regulating the bias position of the continuous fiber 10 in the extruded composite material 14.

In the step S6, the extruded composite material 14 is rapidly cured when the external stimulus (e.g., an irradiation by using the digital graphic ultraviolet light) is applied thereto, and during the extrusion of the composite material, the nozzle 13 always moves vertically upwards, so that the bias position of the continuous fiber 10 can be accurately controlled through the motor 3. During extrusion of the composite material 14, the external stimulus (e.g., the digital graphic ultraviolet light) do not directly applied to the bottom end and top end of the composite material 14. After the parts of the composite material 14 other than the bottom end and the top end of the composite material 14 is fully cured under the external stimulus, a print head is moved to rotate the composite material 14 around its bottom end to a desired angle, then sufficient external stimulus (e.g. the sufficient irradiation by using the ultraviolet light) is applied to make the composite material 14 fully cured, thereby the target structure 15 meeting the requirements is produced on the printing base plate 16.

We claim:

1. A direct ink writing device for a bias-controllable continuous fiber reinforced composite material, comprising:
   a cartridge, wherein:
   the cartridge is fixed to an external device through a cartridge holder, a bottom of the cartridge is connected to a nozzle, and a perforated printing base plate is arranged below the nozzle;
   the cartridge is provided with a through hole on one side of the cartridge so as to be connected to a hose and in turn connected to a solution storage and an air pump;
   a piston is arranged in the cartridge, the piston is provided with an upper chamber for containing sealing liquid and a capillary for a continuous fiber to pass through, a bore is formed in a top of the piston for leading out the continuous fiber, and the continuous fiber led out through the bore is configured to connect to a tensioning wheel;

the piston is fixedly connected to a connecting shaft, the connecting shaft is connected to an external vertical moving device through a rotary bearing, the rotary bearing is connected to a motor belt wheel of a motor through the belt wheel and a synchronous belt, and the motor is fixed to the external vertical moving device through a motor seat; and centers of an inner circumference and an outer circumference of the cartridge do not coincide with each other, the center of the outer circumference of the cartridge coincides with an axis of the connecting shaft, the center of the inner circumference of the cartridge coincides with an axis of the piston, and the upper chamber of the piston contains the sealing liquid, and a lower chamber of the cartridge contains a printing matrix solution.

\* \* \* \* \*